A. HEUCKENDORFF.
WAVE MOTOR.
APPLICATION FILED FEB. 21, 1910. RENEWED AUG. 15, 1911.
1,006,214.
Patented Oct. 17, 1911.
2 SHEETS—SHEET 1.
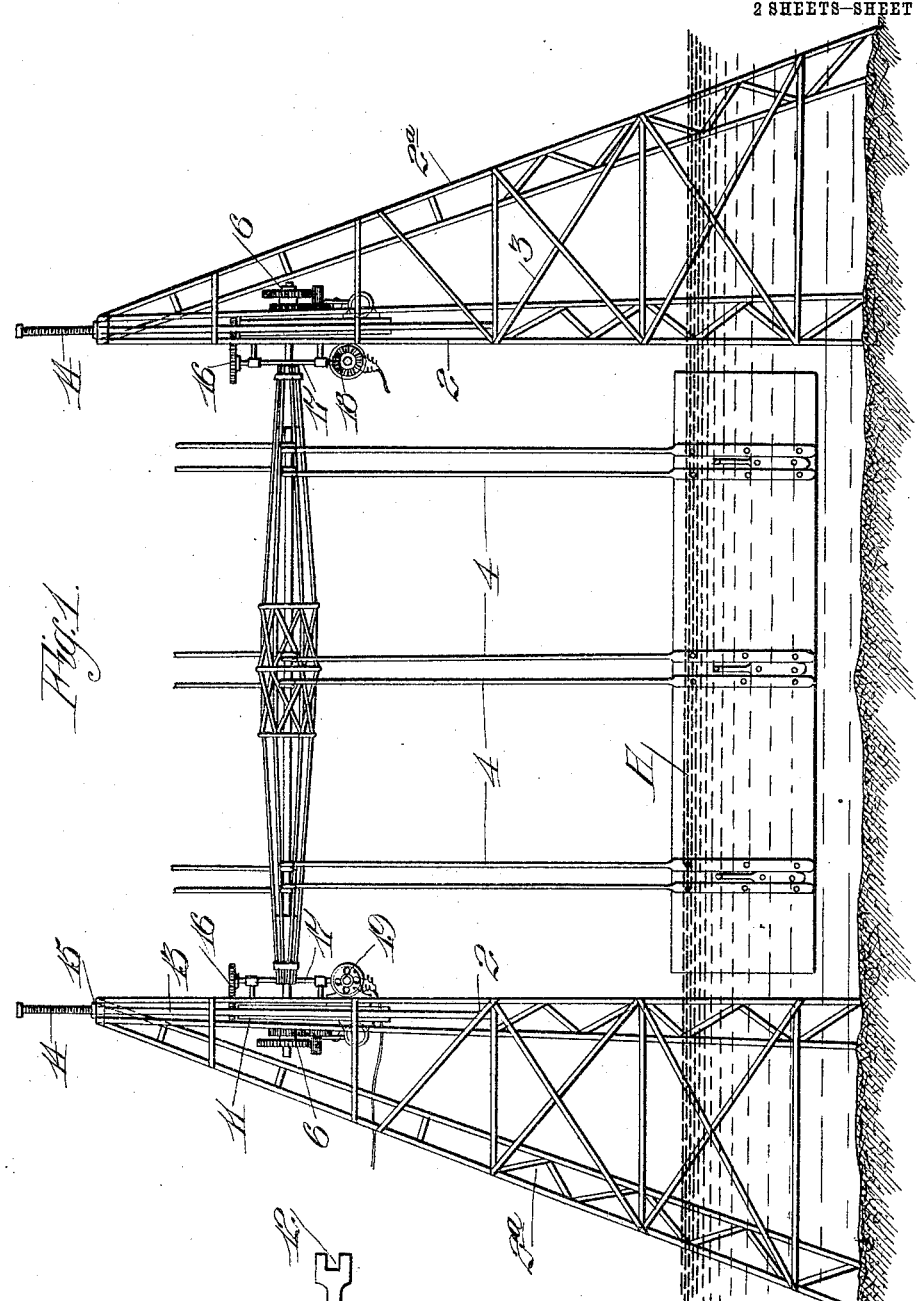

A. HEUCKENDORFF.
WAVE MOTOR.
APPLICATION FILED FEB. 21, 1910. RENEWED AUG. 15, 1911.
1,006,214.
Patented Oct. 17, 1911.
2 SHEETS—SHEET 2.
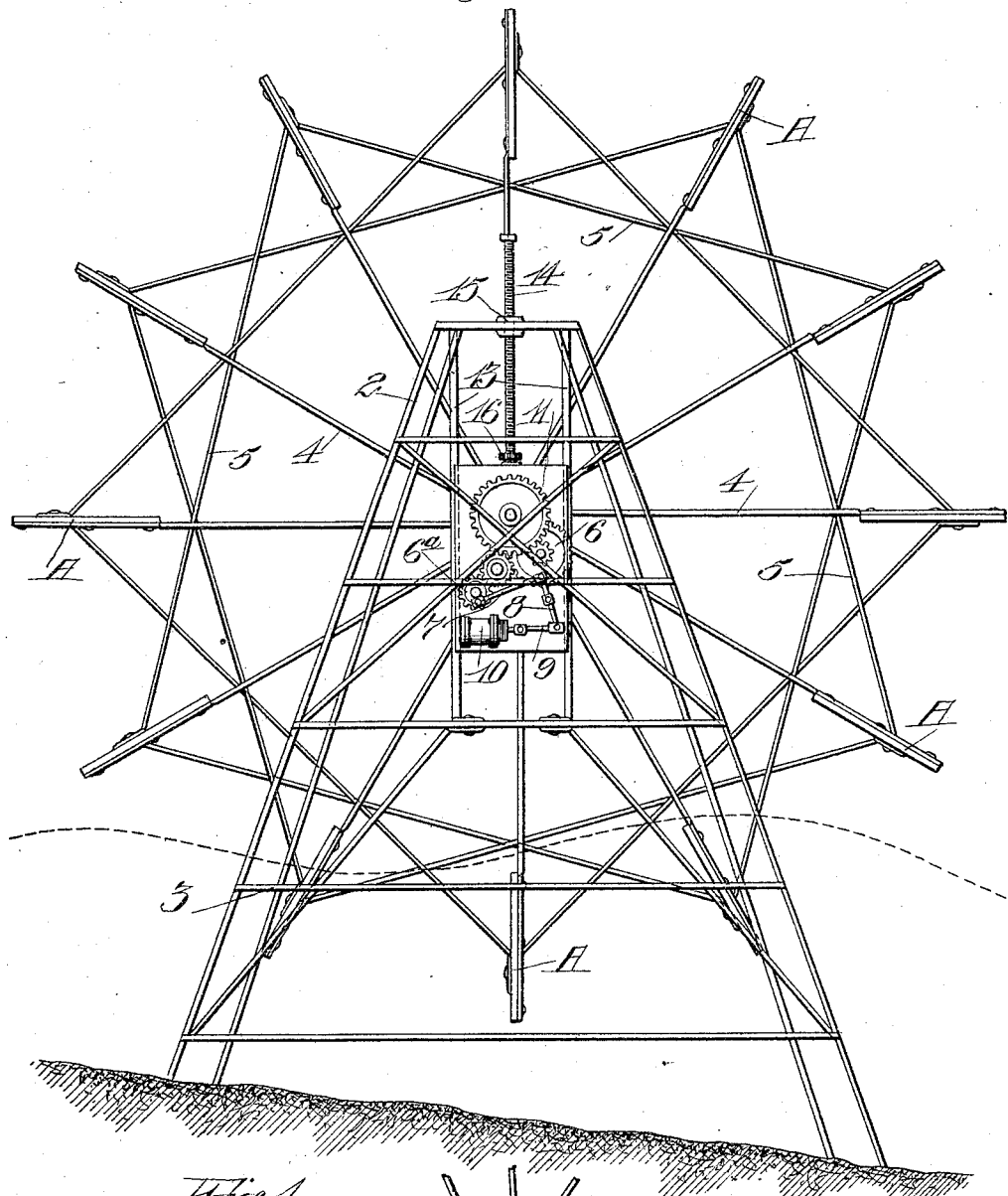
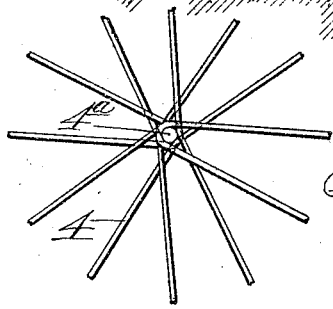

UNITED STATES PATENT OFFICE.

ARNOLD HEUCKENDORFF, OF BERKELEY, CALIFORNIA.

WAVE-MOTOR.

1,006,214. Specification of Letters Patent. Patented Oct. 17, 1911.

Application filed February 21, 1910, Serial No. 544,978. Renewed August 15, 1911. Serial No. 644,183.

*To all whom it may concern:*

Be it known that I, ARNOLD HEUCKENDORFF, a citizen of the United States, residing at Berkeley, in the county of Alameda and State of California, have invented new and useful Improvements in Wave-Motors, of which the following is a specification.

My invention relates to improvements in that class of apparatus which is designed to generate power from the movement of the waves of the sea.

It consists in the combination of parts, and details of construction which will be more fully explained by reference to the accompanying drawings, in which—

Figure 1 is an elevation showing a side view of part of the wheel, with the towers and adjusting mechanism. Fig. 2 is a detached view of a guide arm. Fig. 3 is an end view showing the wheel, and the transmitting mechanism, also the tower and vertical adjustment. Fig. 4 is a detail of the wheel construction.

It is the object of my invention to utilize the movement of the waves of the sea, as they oscillate backward and forward, and especially near the shore.

In my device I employ a wheel having paddles A, this wheel having a central shaft, the ends of which are carried by vertically adjustable bearings in towers 2 which are located contiguous to each end of the wheel, and which are firmly fixed at the bottom to resist the overturning or dislodging tendency of the waves. These towers are preferably built up of steel or iron, and have diverging steel bracing sections $2^a$, and intermediate connecting bracings, as shown at 3. Such a structure forms a very rigid, and at the same time open support through which the waves of the sea can readily pass without too much obstruction.

The vanes or paddles of the wheel are supported by a structure which is composed of radial and diagonal rods or arms. The radial arms 4 are preferably made in the form of rods bent to pass around central supports so that each rod is of a length to form two wheel spokes or arms, each being bent at right angles at the center, as shown at $4^a$ Fig. 4. The outer ends of these arms are connected by brace rods 5 which are so disposed that in a wheel, as here shown, composed of twelve floats or vanes, each four floats are so connected by the brace rods 5 that there will be in each case two intermediate arms and floats, thus four of the floats are united by arms 5, which form a rectangular frame; next, four floats are connected by a similar rectangular frame, and so on until all of the floats are thus connected, and the crossing points of these rectangular frames may also be tied to each other, and to the radial spokes or rods which form the wheel. There may be as many of these wheel frames as may be desired intermediate of the length of the wheel, and they form a very rigid and substantial wheel when the floats have been attached, with very little obstruction to the rush of the waves, the floats offering just sufficient obstruction so that the waves will cause the wheel to swing backward and forward, sometimes advancing in one direction or the other. Power is admitted from this wheel by means of a train of gearing, as shown at 6, there being as many gear-wheels meshing, and of such proportionate sizes as will produce the desired movement of the last of the train from the much slower movement of the paddles of the wheel. In this case the last wheel $6^a$ of the train of gearing is united by a connecting rod 7 with a centrally fulcrumed oscillating lever 8, and the opposite end of this lever is connected by a pitman 9, with the piston rod of an air or other pumping cylinder 10. It will be seen that with such construction the slow oscillations or movements of the wheel paddles by the forward and reverse action of the waves will be transmitted so as to produce a very considerable number of strokes of the pump at each movement of the wheel, and the air or fluid thus set in motion is transmitted through pipes and connections, not here shown, to a suitable reservoir where the power may be stored, and converted by suitable well known mechanism into electrical energy, or other desirable power.

As the tides constantly rise and fall, it will be necessary to adjust the height of the wheel from time to time so that it will not be submerged too deeply for effective operation. This adjustment is effected by means of vertically movable and guided supports 11 in which the journal-boxes of the wheel axle are carried. This movable part has cross head arms channeled at the outer end, as shown at 12, Fig. 2, and these are slidable upon corresponding guides 13 in their vertical movements. It will be understood that the guides or the cross head may be channeled, the other member being correspondingly formed to fit the channels. The upper ends of the movable rod are screw-threaded, as shown at 14, and turnable through the nuts 15. These vertically moving portions are revolved by means of gears, as shown at 16; one movable upon a feather or spline upon the vertical shaft, and maintained in position to engage with the other member of the gear 16 which is fixed upon a vertically journaled shaft 17, and these shafts are driven by bevel gears 18 through the action of an electro motor or motors 19.

A single motor, or a plurality of such motors may be employed; in any event connections are made through the line of the wheel shaft or support, so that the raising and lowering gear is moved in unison, and both ends of the wheel are raised and lowered at the same instant. I am thus enabled to maintain the wheel at its proper level at whatever point it may be adjusted during the rise and fall of the tide.

The whole apparatus provides a very flexible means for translating the motion of the waves into a power which may be usefully applied.

Having thus described my invention, what I claim and desire to secure by Letters Patent is—

1. In a wave motor, a skeleton wheel having a plurality of sets of vanes or paddles, said wheel comprising arms extending between the center of the wheel and the vanes and rectangular braces connecting the sets of vanes in series of four each whereby the wave pressure is concentrated upon the vanes, skeleton towers at each end of the wheel, journal boxes in which the wheel shaft is supported, a train of gearing, and a fluid forcing apparatus energized through said train by the oscillating movements of the wheel.

2. In a wave motor, skeleton braced towers fixed in the path of the waves, a skeleton frame wheel having sets of paddles or vanes at its periphery, said wheel comprising arms extending radially and connecting with the vanes, and rectangular braces connecting the sets of vanes in series of four each, whereby the wave pressure is concentrated upon the vanes, journal-boxes in which the wheel shaft is supported, nals and the wheel to maintain the vanes or paddles in proper relation with the surface of the sea, and a train of gearing, and a pumping mechanism actuated thereby.

3. In a wave motor, a journaled wheel having a central shaft, peripheral paddles, a skeleton support for said paddles consisting of radial arms formed of a single rod bent around a central axle to form two of said radii, and rectangular brace rods connecting the paddle arms in series of four whereby the wave pressure is concentrated upon the paddles.

4. The combination in a wave motor, of skeleton braced towers, a skeleton wheel having sets of peripheral paddles, and having rectangular braces connecting the sets of paddles in series of four each whereby the wave pressure is concentrated upon the paddles, a central shaft extending between the towers, journal-boxes and vertical guides upon which said boxes may be raised and lowered, screw-rods and nuts upon the towers through which said rods are turnable, a motor or motors, and intermediate gears and connections whereby the screw rods are turned, and the opposite ends of the wheel simultaneously raised or lowered, a train of gearing actuated from the axle of the wheel, a pump, and an oscillating lever and connecting rod whereby reciprocating motion is transmitted from the gear train to the pump.

In testimony whereof I have hereunto set my hand in the presence of two subscribing witnesses.

ARNOLD HEUCKENDORFF.

Witnesses:
CHARLES EDELMAN,
C. D. BOWMAN.

---

Copies of this patent may be obtained for five cents each, by addressing the "Commissioner of Patents, Washington, D. C."